United States Patent

Ishii

[15] 3,636,752
[45] Jan. 25, 1972

[54] MICROWAVE FERRITE ACCELERATION SENSOR

[72] Inventor: Thomas Koryu Ishii, Brown Deer, Wis.
[73] Assignee: Mega Power Corporation, Rochester, N.Y.
[22] Filed: Sept. 14, 1970
[21] Appl. No.: 71,668

[52] U.S. Cl. .................................73/517 R, 324/58.5 C
[51] Int. Cl. ...........................................G01p 15/08
[58] Field of Search............................73/516, 517 R, 517 B; 324/58 C, 58.5 C

[56] References Cited

UNITED STATES PATENTS

| | | | |
|---|---|---|---|
| 2,965,841 | 12/1960 | Smoll | 324/58.5 C |
| 2,972,105 | 2/1961 | Ghose | 324/58.5 C X |
| 3,122,927 | 3/1964 | Chass | 73/517 B |
| 3,586,971 | 6/1971 | Bosisio | 324/58.5 C |

Primary Examiner—James J. Gill
Attorney—Shlesinger, Fitzsimmons and Shlesinger

[57] ABSTRACT

A ferrite rod is mounted beneath a movable plunger in a brass cavity resonator, which has resonant properties at microwave frequencies. The plunger applies stresses to the rod proportional to the acceleration of the plunger in a direction parallel to the ferrite central axis. The ferrite internal magnetic field changes with the stresses developed therein resulting from the pressure of the plunger. These changes effect alteration in the ferrite effective permeability and effect proportionate changes or shifts in the cavity resonant frequency. The changes in the resonant frequency may be monitored thus producing an accelerometer.

5 Claims, 3 Drawing Figures

PATENTED JAN 25 1972 3,636,752

INVENTOR.
THOMAS KORYU ISHII
BY
Shlesinger, Fitzsimmons & Shlesinger
ATTORNEYS

MICROWAVE FERRITE ACCELERATION SENSOR

This invention relates to sensors, and more particularly to accelerometers.

Although the magnetostriction effect in ferrites has been studied extensively, practical applications of this effect for sensing purposes have been substantially nonexistent, due primarily to the small or second order magnitude of its influence on the properties of the ferrite. It has been known, for example, that when a ferrite rod is placed in a magnetic field, the permeability of the rod will change when the rod is stressed axially. This change, however, is so slight that it heretofore has been extremely difficult to measure, and consequently the phenomenon has been put to little practical use.

It is an object of this invention to provide a device for sensing the changes in permeability of a ferrite material, produced by changes in stress of the material, and in which the magnetostriction effect can be employed to provide an accelerometer with a sufficiently large scale factor to permit easy detection.

A more specific object of this invention is to provide a device for monitoring the changes in resonant frequency in a microwave resonator in response to changes in stress of a ferrite material mounted in the resonator.

Other objects of the invention will be apparent hereinafter from the specification and from the recital of the appended claims, particularly when read in conjunction with the accompanying drawing.

Figure 1:
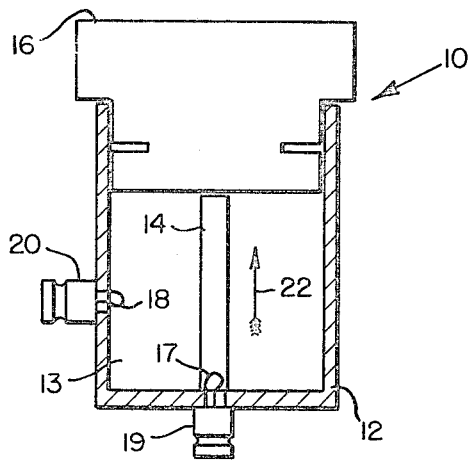
FIG. 1 is a diagrammatic vertical sectional view through a resonator which forms part of an acceleration sensor made in accordance with one embodiment of the invention.

Referring now to the drawing by numerals of reference, and first to FIG. 1, 10 denotes an accelerometer comprising a highly polished, generally cup-shaped housing 12 made of brass or another electrically conductive material, and having a cylindrical cavity 13. Secured in housing 12, and projecting upwardly from the bottom thereof coaxially of the cavity 13, is a thin (e.g., 0.63 cm. diameter) ferrite rod 14. Mounted on the upper end of housing 12, and projecting at its lower end slidably into the upper end of cavity 13 coaxially thereof, is a cylindrical mass or plunger 16, the inner end of which is engageable with the upper end of the rod 14. This mass 16 applies to rod 14 stresses which are proportional to the acceleration of this mass, and in a direction parallel to the axis of the rod.

Also mounted in the bottom of the housing 12 in radially offset relation to rod 14 and the axis of cavity 13, and projecting into cavity 13, is a signal input coupling or wire loop 17. A similar wire loop or coupling 18 is mounted in the sidewall of housing 12 to pick up any signal that is developed in the cavity 13 at the cavity resonant frequency. The loops 17 and 18 which are empirically designed, are connected, respectively, to a pair of conventional connectors 19 and 20, which are fastened to the outside of the housing bottom wall and sidewall, respectively.

The size and shape of cavity 13, and the orientation of couplings 17 and 18, are such that the cavity resonant frequency is independent of the cavity height, and thus small changes in this dimension due to the microscopic movements of plunger 16, will not, of themselves, introduce undesirable frequency shifts.

In use, the housing 12 is mounted in a biasing magnetic field which extends in the direction indicated by the arrow 22 in FIG. 1. This external magnetic field, which for purposes of illustration may be a DC excited field of 1,000 oersteds, induces in the ferrite rod 14 an internal DC magnetic field. The rod 14 possesses a significant saturation magnetostriction coefficient, for example on the order of $-6 \times 10^{-6}$. Consequently, when stresses are developed in the ferrite rod by depressing the plunger 16 axially against the rod 14, small but appreciable changes in the internal magnetic field of the rod will take place. These field changes in turn produce a variation in the effective permeability of the rod. Since resonant frequency of the cavity 13 is a function of the permeability (and permittivity) of all of the elements disposed within the cavity, the resonant frequency of the cavity therefore also will shift or change in response to the change in the permeability of rod 14. This change in the resonant frequency of the cavity 13 is, in effect, therefore, a measurement of the acceleration of plunger 16, because the plunger applies to the rod 14 stresses which are proportional to the acceleration of the plunger in a direction parallel to the axis of the rod. When the change or shift in the resonant frequency of the cavity 13 is sufficiently large, it can be monitored by the signal output loop 18 to sense or detect variations in the acceleration of plunger 16.

Figure 2:
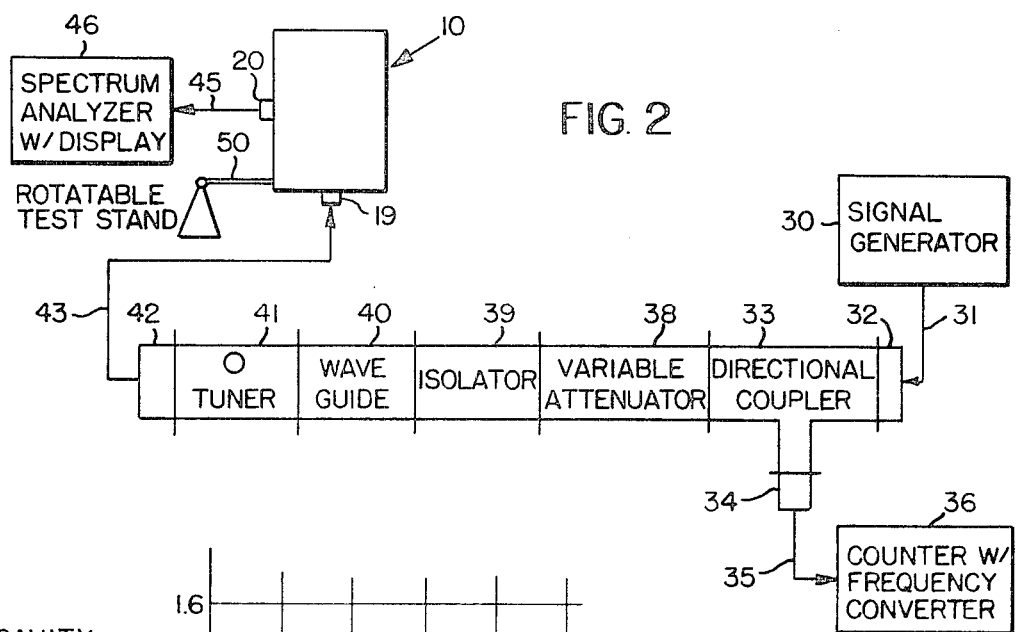
FIG. 2 is a schematic diagram of the sensing equipment used to monitor shifts in the resonant frequency of the resonator in response to changes in stress of a ferrite rod mounted therein.

The coupling loops 17 and 18 are designed, respectively, to introduce microwave frequency energy from an external source to the cavity 13, and to monitor the cavity response to this energy. As shown by way of example in FIG. 2, microwave signals at approximately 1 milliwatt may be produced by a signal generator 30 with a tunable frequency range, at constant output, of from 7.0 to 10.5 gigaHertz. These signals are applied by a cable 31 and an adapter 32 to a directional coupler 33, which diverts one half of the power generated by these signals through an adapter 34 and a coaxial cable 35 to a digital counter and frequency converter 36. This unit continuously monitors the frequency of the signals produced by the generator 30, and has a digital output usable to 1 Hertz, if needed. The other half of the power output of the generator 30 is applied by the coupler 33 through a variable attenuator 38, an isolator 39, a wave guide section 40, a tuner 41, an adapter 42 and a coaxial cable 43 to the signal input loop 17 in the accelerometer 10. Any signal then developed as a resonant frequency of the cavity 13 is picked up by the signal loop 18 and is transmitted by a coaxial cable 45 to a spectrum analyzer 46 having a display, which displays the amplitude of the sensed signal versus a selectable frequency scale.

To determine the acceleration applied at any given instant to the mass or plunger 16, the signal generator 30 can be swept in frequency at constant power output until the resonant frequency peak of the device is noted by choosing the highest amplitude signal on the display of the spectrum analyzer 46, the exact frequency then being read off the digital counter 36. The exact acceleration of the mass 16 can then be determined by reference to the characteristic frequency versus acceleration curve for the sensor 10, one such curve being illustrated by way of example in FIG. 3.

Figure 3:
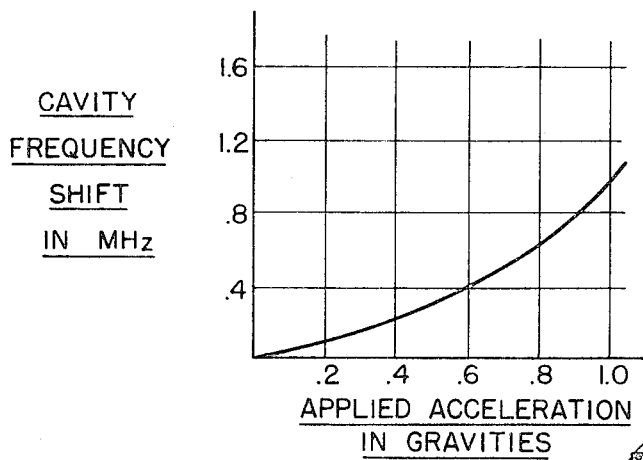
FIG. 3 illustrates a graph illustrating the relation of change in stress of the ferrite rod to change in resonant frequency in the sensing equipment of FIG. 2.

The curve of FIG. 3 can be determined, for example, by mounting the accelerometer or sensor 10 in a rotatable test stand 50 (FIG. 2) in such manner that the accelerometer's sensitive axis can be rotated in the earth's gravitational field so that accelerations of from 0 to 1.0 gravity can be used for testing purposes. Starting at a given level of acceleration determined by measuring the angle between the accelerometer's sensitive axis and the local vertical, the signal generator 30 is swept in frequency at constant power output until the resonant frequency peak of the cavity 13 is noted by choosing the highest amplitude signal on the display of the spectrum analyzer 46. As noted above, the exact frequency may then be read off the digital counter 36. The test stand 50 is then rotated so as to produce a different acceleration level for the sensor 10, and the above procedure is repeated until a new resonant frequency is determined. This process is repeated with each resonant frequency being plotted against the corresponding acceleration (in gravity) until, as noted, in FIG. 3, the curve of this relationship is determined. This curve may then be used, as noted above, to determine the acceleration in gravities that is applied to the mass 16 for any given resonant frequency detected by the analyzer 46.

From the foregoing it will be apparent that the instant invention provides a novel acceleration sensor, which is capable of measuring changes in acceleration of a mass by detecting and determining the change in resonant frequency of a sensor cavity of the type described herein. The component parts of the accelerometer, including the brass housing 12, the ferrite core 14 and the mass 16, form a very reliable and rugged device capable of withstanding extremely high temperatures and accelerations. Moreover, as compared to prior such devices, the novel accelerometer disclosed herein is extremely durable and inexpensive to manufacture, the ferrite rod or sensor 14 itself being nearly indestructable under normal circumstances.

In a specific application of this invention the ferrite rod 14 was found to perform satisfactorily when it comprised a magnesium-manganese alloy having the general composition: Mg $0.6$ Mn$_{0.4}$ Fe$_2$O$_4$. For a small rod of this type properly centered axially in cavity 13, the electric field component is zero, and undesireable frequency shifts due to permittivity changes with stress are negligible.

Having thus described my invention, what I claim is:

1. An acceleration sensor, comprising
   a ferrite rod secured in said cavity,
   a mass movably mounted in said cavity for limited reciprocation therein, and engageable with one end of said rod to stress said rod axially upon acceleration of said mass in one direction,
   means for applying microwave wave signals to said resonator, and
   means for detecting changes in the resonant frequency of said resonator in response to changes in the stresses developed in said rod by said mass.

2. An acceleration sensor as defined in claim 1, wherein said resonator comprises a cup-shaped housing containing said cavity and disposed in a magnetic field extending parallel to said rod.

3. An acceleration sensor as defined in claim 2, wherein said signal applying means comprises
   a signal generator,
   means for monitoring the output of said generator,
   a signal input coupling disposed in the bottom of said housing,
   means for applying part of the output of said generator to said input coupling, and
   means for applying the remainder of said output to said monitoring means.

4. An acceleration sensor as defined in claim 3, wherein said detecting means comprises
   a second signal coupling disposed in said housing to detect the resonant frequency thereof,
   a spectrum analyzer for receiving the signals detected by said second coupling, and
   means connected to said analyzer for displaying the signal detected by said second coupling.

5. An acceleration sensor as defined in claim 2, including means mounting said housing for rotation about a stationary axis to accelerate said mass.

* * * * *